United States Patent
Shotton et al.

(10) Patent No.: US 10,218,882 B2
(45) Date of Patent: Feb. 26, 2019

(54) FEEDBACK FOR OBJECT POSE TRACKER

(71) Applicant: Microsoft Technology Licensing, LLC, Redmond, WA (US)

(72) Inventors: Jamie Daniel Joseph Shotton, Cambridge (GB); Andrew William Fitzgibbon, Cambridge (GB); Jonathan James Taylor, London (GB); Richard Malcolm Banks, Egham (GB); David Sweeney, London (GB); Robert Corish, London (GB); Abigail Jane Sellen, Cambridge (GB); Eduardo Alberto Soto, Hamilton (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 175 days.

(21) Appl. No.: 14/985,854

(22) Filed: Dec. 31, 2015

(65) Prior Publication Data

US 2017/0193667 A1     Jul. 6, 2017

(51) Int. Cl.
   *G06F 3/01*  (2006.01)
   *G06T 7/20*  (2017.01)
   *H04N 5/225*  (2006.01)

(52) U.S. Cl.
   CPC ............ *H04N 5/225* (2013.01); *G06F 3/011* (2013.01); *G06F 3/016* (2013.01); *G06T 7/20* (2013.01); *G06T 2200/24* (2013.01); *G06T 2207/30196* (2013.01)

(58) Field of Classification Search
   CPC ........................ G06T 7/2033; G06T 7/0042
   See application file for complete search history.

(56) References Cited

U.S. PATENT DOCUMENTS

| | | | |
|---|---|---|---|
| 8,217,856 B1 | 7/2012 | Petrou | |
| 8,405,706 B2 | 3/2013 | Zhang et al. | |
| 2009/0284529 A1* | 11/2009 | De Aguiar | G06T 13/40 345/420 |
| 2010/0269072 A1* | 10/2010 | Sakata | G06F 1/1601 715/863 |
| 2010/0281432 A1* | 11/2010 | Geisner | G06F 3/011 715/849 |
| 2010/0306685 A1 | 12/2010 | Giaimo, III et al. | |
| 2011/0107216 A1 | 5/2011 | Bi | |

(Continued)

OTHER PUBLICATIONS

Bowman et al., "An Introduction to 3-D User Interface Design," In Journal Presence: Teleoperators and Virtual Environments, vol. 10, Issue 1, Feb. 2001, pp. 96-108.
Cheng et al., "Real-time Monocular Tracking of View Frustum for Large Screen," In Proceedings of the Twenty-Eighth Australasian Computer Science Conference, Jan. 2005, 9 pages.

(Continued)

*Primary Examiner* — Kim Y Vu
*Assistant Examiner* — Molly Delaney
(74) *Attorney, Agent, or Firm* — Schwegman Lundberg & Woessner, P.A.

(57) ABSTRACT

A computing device has an input configured to receive data captured by at least one capture device where the data depicts at least part of an object moving in an environment. The computing device has a tracker configured to track a real-world position and orientation of the object using the captured data. A processor at the computing device is configured to compute and output feedback about performance of the tracker, where the feedback encourages a user to adjust movement of the object for improved tracking of the object by the tracker.

19 Claims, 6 Drawing Sheets

(56) References Cited

U.S. PATENT DOCUMENTS

| | | | |
|---|---|---|---|
| 2011/0193939 A1* | 8/2011 | Vassigh | G06F 3/011 348/46 |
| 2011/0273380 A1* | 11/2011 | Martin | G06F 3/04883 345/173 |
| 2011/0320949 A1* | 12/2011 | Ohki | G06F 17/245 715/727 |
| 2012/0068913 A1 | 3/2012 | Bar-Zeev et al. | |
| 2012/0276995 A1* | 11/2012 | Lansdale | A63F 13/65 3/65 |
| 2014/0002443 A1 | 1/2014 | Cunningham | |
| 2014/0098085 A1 | 4/2014 | Lee et al. | |
| 2014/0205146 A1* | 7/2014 | Holz | G06T 7/004 382/103 |
| 2014/0267263 A1 | 9/2014 | Beckwith et al. | |
| 2015/0049012 A1 | 2/2015 | Liu et al. | |
| 2015/0125043 A1* | 5/2015 | Kimura | G06F 3/017 382/106 |
| 2015/0205359 A1* | 7/2015 | Feng | G06F 3/017 715/863 |
| 2015/0234193 A1 | 8/2015 | Lyons | |
| 2015/0317832 A1 | 11/2015 | Ebstyne et al. | |
| 2016/0098095 A1* | 4/2016 | Gonzalez-Banos | G06F 3/017 345/156 |

OTHER PUBLICATIONS

Ozgur, "Intelligent User Interface for Roombots," retrieved on: Oct. 1, 2015, available at: <<http://biorob.epfl.ch/files/content/users/233023/files/public/roombotsui/report.pdf>> 8 pages.

PCT Search Report dated Mar. 29, 2017 for PCT application No. PCT/US2016/068164, 14 pages.

Rho, "User Interface Issues of 3D Gesture Mobile Devices and Visual Feedback of Physiotherapy Application," In Technical Report No. UCB/EECS-2013-88, May 17, 2013, 14 pages.

Wierinck et al., "Effect of Augmented Visual Feedback from a Virtual Reality Simulation System on Manual Dexterity Training," In European Journal of Dental Education, Feb. 2005, 2 pages.

Rho, Ryan, "User Interface Issues of 3D Gesture Mobile Devices and Visual Feedback of Physiotherapy Application", In Technical Report No. UCB/EECS-2013-88, May 17, 2013, 14 pages.

Ozgur, Ayberk, "Intelligent User Interface for Roombots", Retrieved on: Oct. 1, 2015, 8 pages. Available at: http://biorob.epfl.ch/files/content/users/233023/files/public/roombotsui/report.pdf.

"International Preliminary Report on Patentability Issued in PCT Application No. PCT/US2016/068164", dated Mar. 7, 2018, 8 Pages.

"Second Written Opinion Issued in PCT Application No. PCT/US2016/068164", dated Nov. 15, 2017, 7 Pages.

* cited by examiner

FEEDBACK FOR OBJECT POSE TRACKER

BACKGROUND

Tracking objects in three dimensions (3D) involves calculating the global position and orientation of the object from captured sensor data, and where the object is articulated (such as the human body, a human hand or a laptop computer), calculating positions of one or more joints. There is an increasing need to improve accuracy of such tracking to give better control of systems which use the tracking data, such as augmented reality systems, virtual reality systems, medical equipment, natural user interfaces, game systems and others. Where tracking fails or is inaccurate this produces problems in the systems that use the tracking data.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

A computing device has an input configured to receive data captured by at least one capture device where the data depicts at least part of an object moving in an environment. The computing device has a tracker configured to track a real-world position and orientation of the object using the captured data. A processor at the computing device is configured to compute and output feedback about performance of the tracker, where the feedback encourages a user to adjust movement of the object for improved tracking of the object by the tracker.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

An improved tracker for tracking 3D position of objects from captured sensor data such as images, is described. In some examples the tracker is also configured to calculate shape parameters of the object although this is not essential. The tracker has a feedback engine which computes and outputs feedback about performance of the tracker. For example, tracker performance often deteriorates when the tracked object comes into proximity with another object which is difficult to segment from the tracked object. For example, tracker performance breaks down and/or deteriorates when an object being tracked nears the limits of a region of real world space within which the tracker is able to operate. Tracker performance often breaks down or drops where there are occlusions in the captured sensor data. Tracker performance may also drop for other reasons including ambient illumination changes, changes in temperature or moisture levels, changes in conditions that affect sensors capturing data used by the tracker.

The feedback encourages a user to adjust movement of the object for improved tracking of the object by the tracker. For example, to encourage the user to separate the object from other objects, to make the object static, to remove occlusions, to move the object into better conditions such as better lighting, to move the object into a region of space where the tracker is able to operate well or others.

The feedback is explicit in some examples, such as visual or auditory or haptic feedback (or combinations of one or more of these). For example, visual indications of a tracking volume can be given. In some examples the feedback is implicit so that the user is not aware of the feedback and can continue with other tasks without being interrupted. For example, if tracker performance is detected as dropping, because the user's hands which are being tracked are coming close together, then the feedback may comprise making avatar hands depicting a user's real hands closer together than the tracked real-world positions of the user's hands. This encourages the user to keep their hands apart so that the tracker performance is improved. The user does not perceive the disparity between the real-world hand position and the avatar hand position and in this way the tracker is very easy to use.

Figure 1:
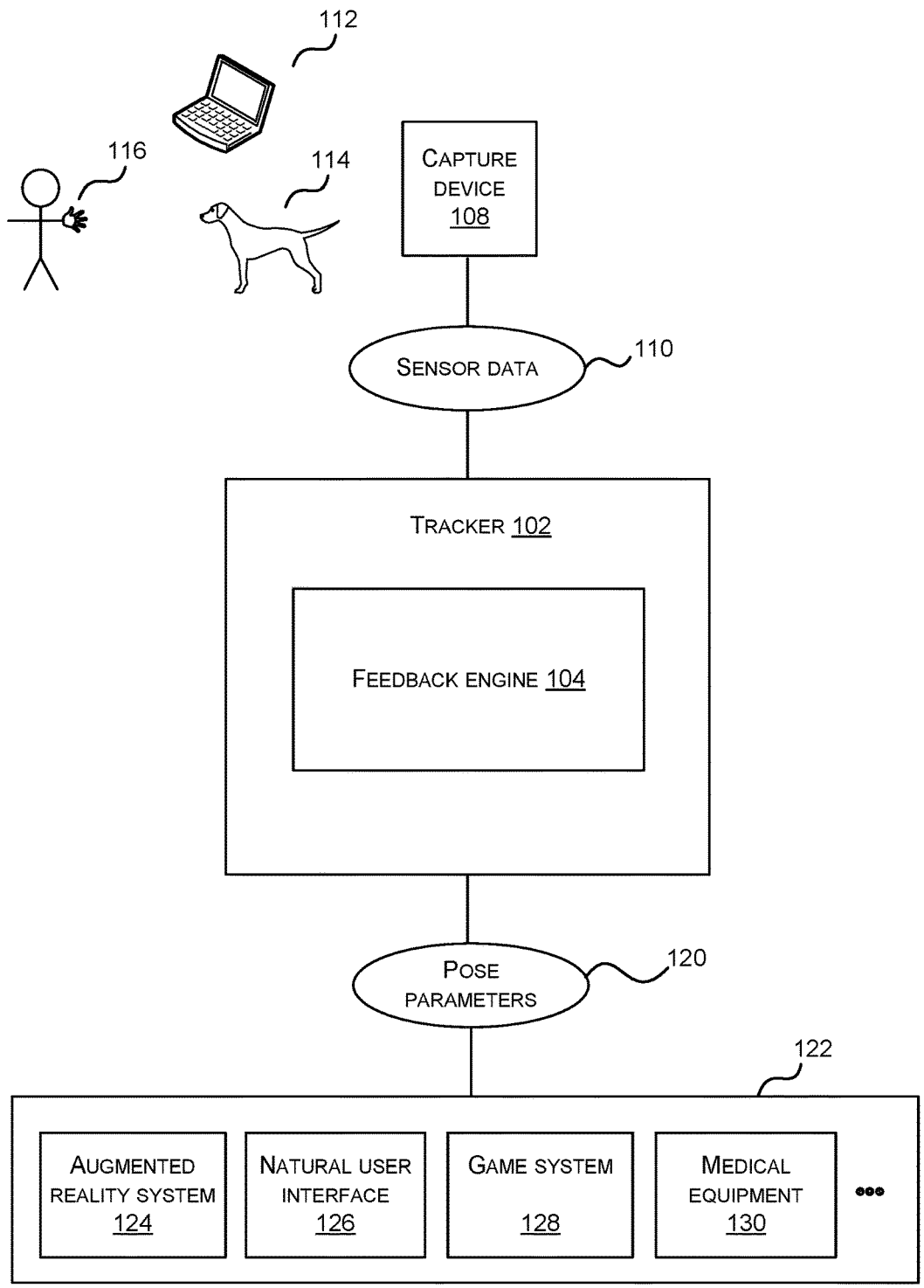
FIG. 1 is a schematic diagram of a tracker used to track 3D position and orientation of objects.

FIG. 1 is a schematic diagram of a computer implemented tracker 102 used to track 3D position of objects 116, 112, 114. An object is all or part of an inanimate or animate entity. A non-exhaustive list of examples of objects which are tracked by tracker 102 is articulated objects with a plurality of joints, such as a human body, animal body, human hand, human head and shoulders, laptop computer or others, deformable objects such as fabric, cushions, and objects in the environment such as surfaces, ceiling, floor, wall, table top and other surfaces. The objects can be static or moving in an environment and sensor data depicting the object(s) is captured using a capture device 108 such as a camera, depth camera, color camera, video camera, medical imaging device, range scanner or other sensor. The sensor data 110 may comprise images, videos, 3D point clouds or other sensor data. The sensor data 110 is received at an input of the tracker 102 such as a wireless receiver, a wired communications port, a digital versatile disc drive, a universal serial bus port or other input. The sensor data 110 is sent to the tracker 102 over a communications network in some examples, from multiple capture devices 108.

The tracker 102 computes pose parameters 120 including position and orientation of the tracked object(s) from the sensor data 110. The pose parameters 120 may include position and orientation of a plurality of joints of the object. In some examples the tracker is also configured to calculate shape parameters of the object. It may use any type of tracking technology such as template matching where the sensor data is matched to templates of objects in known poses, a machine learning system which has been trained with sensor data labelled with known object poses, model fitting where the sensor data is fitted to a 3D model of the object. The tracker has a feedback engine 104 which monitors performance of the tracker and which computes and outputs feedback to improve tracking performance.

The pose parameters 120 (and the shape parameters where available) from the tracker are input to a downstream system 122 such as an augmented reality system 124, a natural user interface 126, a game system 128, medical equipment 130 or others.

Examples are now described with reference to FIGS. 2 to 4 where the tracker 102 is configured to track hands. However, these examples are also applicable to tracking other types of objects including whole people, animals, inanimate objects, articulated objects and others.

The tracker can be implemented using software executed on a computing device. In some examples, the functionality of the tracker 102 can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

Figure 2:
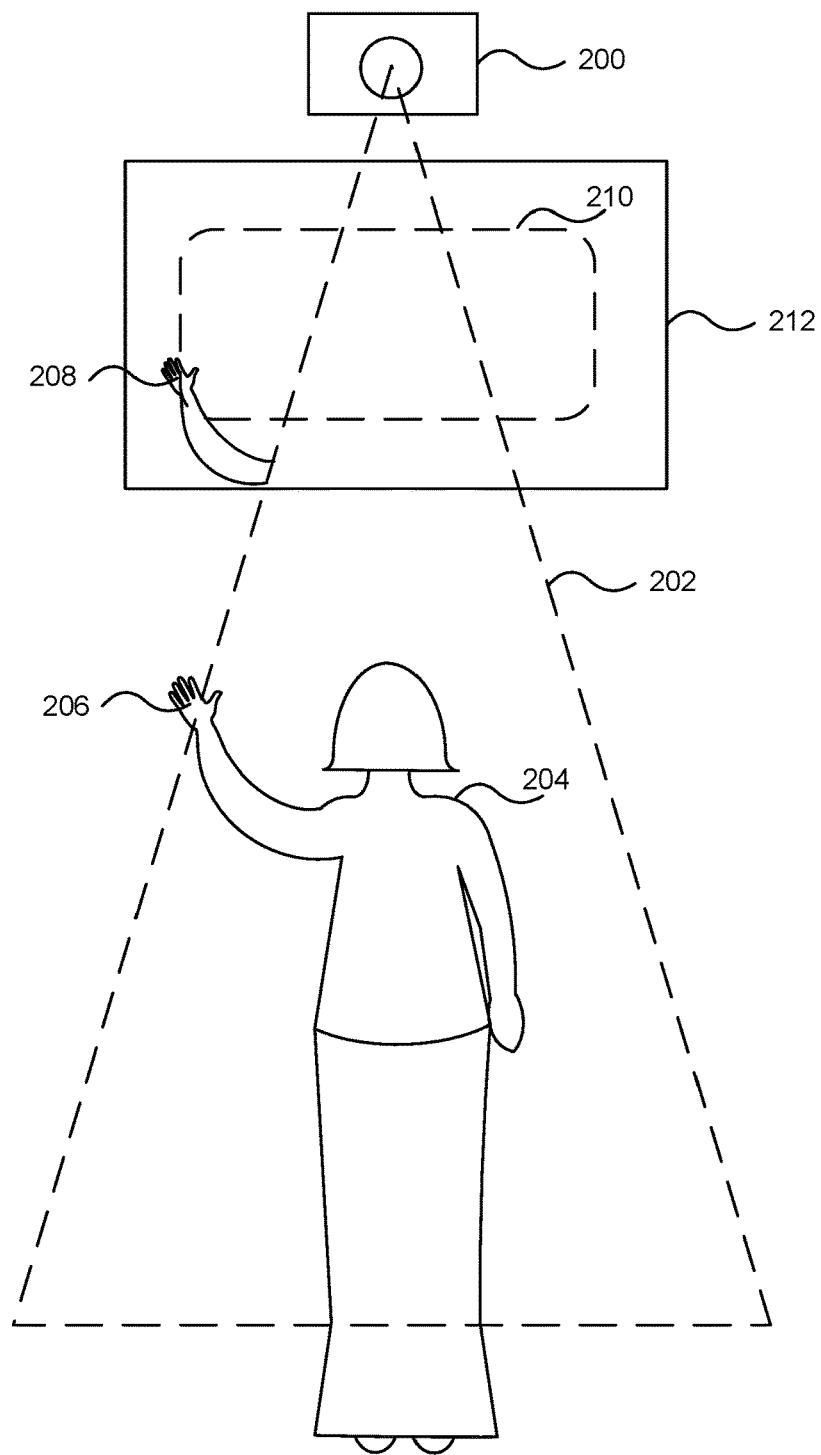
FIG. 2 is a schematic diagram of a tracking volume of a room mounted camera.

FIG. 2 is a schematic diagram of a tracking volume 202 of a room mounted camera 200 such as a depth camera and/or color camera. Any camera(s) or other capture devices may be used which sense data depicting objects in the view frustum of the camera. The camera 200 captures images which are used by a tracker, such as the tracker 102 of FIG. 1 to track objects in the view frustum of the camera. The view frustum of the camera is a volume of real world space depicted in images captured by the camera. The view frustum of the camera is known from details of the camera manufacture and is found by calibration or from manufacturing data. In the example of FIG. 2 there is only one camera but it is also possible to have deployments with a plurality of cameras. Where there are a plurality of cameras the view frustum of each camera is known. In the example of FIG. 2 the view frustum of the camera is not shown and is bigger than the tracking volume so that the images captured by the camera 200 depict the whole person 204 even with her hand raised as shown.

The tracking volume 202 is a volume of real world space computed by the tracker such that objects within the tracking volume can be tracked accurately assuming there are no occlusion, segmentation, illumination or other problems. The tracking volume is a region of real-world space in the environment for which the tracker is able to track objects anywhere in the volume (assuming no occlusion, suitable lighting etc.) In some examples the tracking volume 202 is computed so that it is related to the view frustrum (or view frusta if there are two or more cameras), for example, by being a smaller version of the view frustrum. Where there are two or more cameras the tracking volume may be computed so that it is related to how the view frusta of the cameras intersect. In some examples the tracking volume 202 is determined empirically by measuring performance of the tracker at different regions of space when tracking an object with no occlusions under the same conditions.

A person 204 is standing looking at a wall mounted display screen 212 above which the camera 200 is mounted. The camera 200 is in communication with a tracker, such as the tracker 102 of FIG. 1, over a wired or wireless connection. The pose parameters (and optional shape parameters) computed by the tracker 102 are input to a natural user interface system which comprises the wall mounted display screen 212. The user can see a virtual object comprising an avatar 208 of her hand on the display screen 212. The avatar hand 208 is computed by the natural user interface system using the pose parameters from the tracker. In some examples, a head mounted display is used in place of, or in addition to, the wall mounted display screen. The head mounted display may be one which provides virtual reality or mixed reality displays. In some examples, the pose parameters and optional shape parameters are input to a device which provides auditory and/or haptic feedback to the user.

In this example, the feedback engine 104 computes and outputs feedback which is an instruction to the natural user interface system to display a visual indication 210 of the tracking volume 210 on the display screen 212. For example, pixels depicting regions outside the tracking volume may be black and pixels depicting regions inside the tracking volume may have color. However, this is one example only and other ways of visually representing the tracking volume can be used. When the user sees her avatar hand 208 move outside the tracking volume as shown she knows to bring it back into the tracking volume because of the visual feedback. This example may be modified to use audio feedback or haptic feedback. That is, any one or more of visual, audio, haptic feedback may be used. In the case of audio feedback the natural user interface system comprises one or more loudspeakers in the room. In the case of haptic feedback the natural user interface system comprises one or more haptic feedback mechanisms. For example, hand or wrist worn devices (such as smart watches or others) with vibration motors. Worn devices incorporating loudspeakers are used in some examples to provide auditory feedback.

In some examples the tracker 102 monitors the tracking performance, for example, by monitoring when the tracked object is moving towards a boundary of the tracking volume. In that case it is able to compute and output feedback as mentioned above. In some examples the feedback comprises instructing the natural user interface system to control a degree of transparency or fade of the avatar hand 208. For example, the tracking performance may be monitored by computing a path of the tracked object and extrapolating the path.

In some examples the tracking performance is monitored by detecting acceleration of the tracked object towards a boundary of the tracking volume. In this case the feedback may comprise using a non-linear mapping between the tracked object real world acceleration and the virtual object acceleration. For example, to enable the user 204 to reach a virtual object which is just outside the tracking volume 202.

Figure 3:
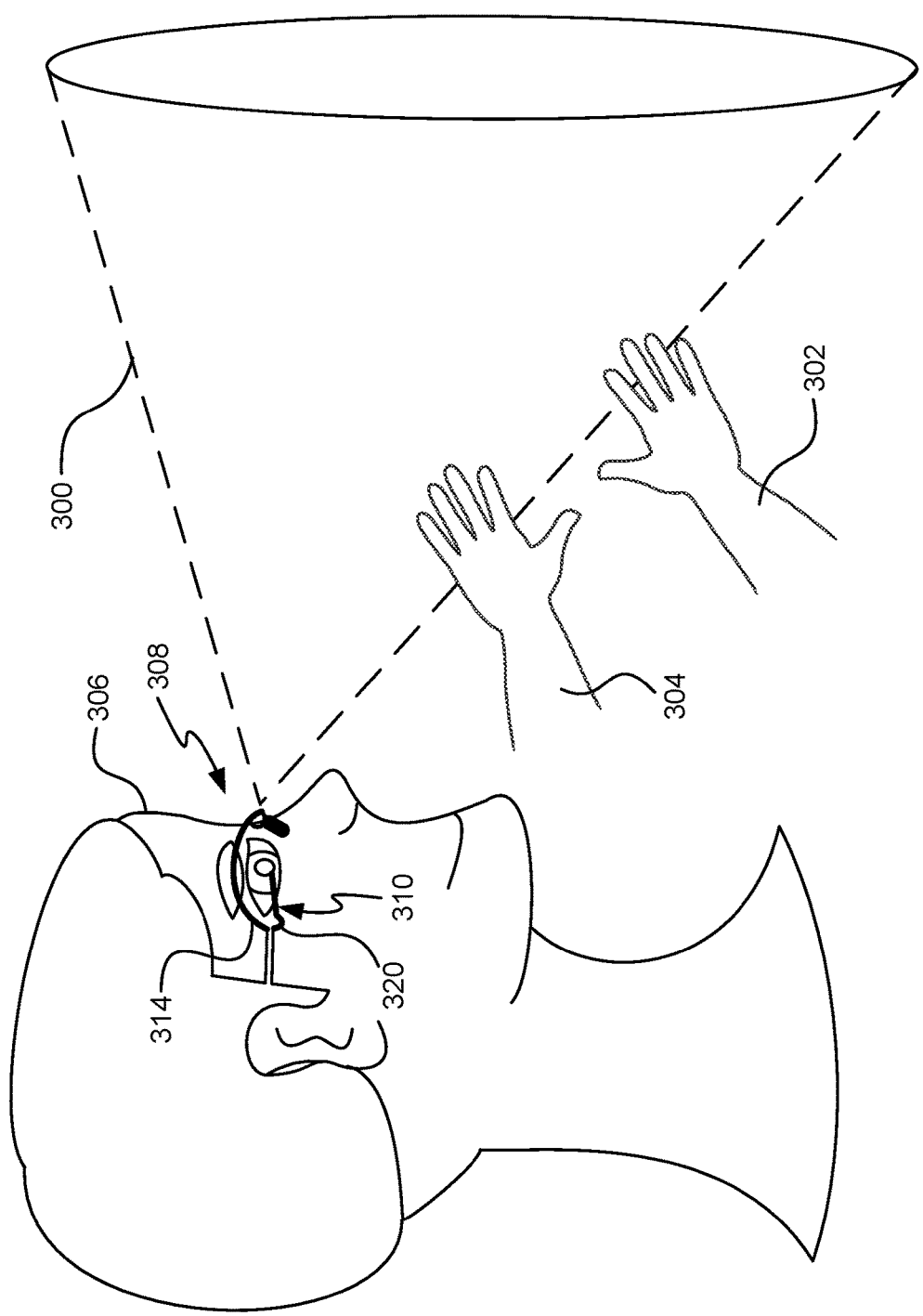
FIG. 3 is a schematic diagram of a tracking volume of a head mounted camera.

FIG. 3 is a schematic diagram of a tracking volume of a head mounted camera which is part of a wearable computing device 308 worn by a user 306. The wearable computing device is shown in more detail in FIG. 4.

Figure 4:
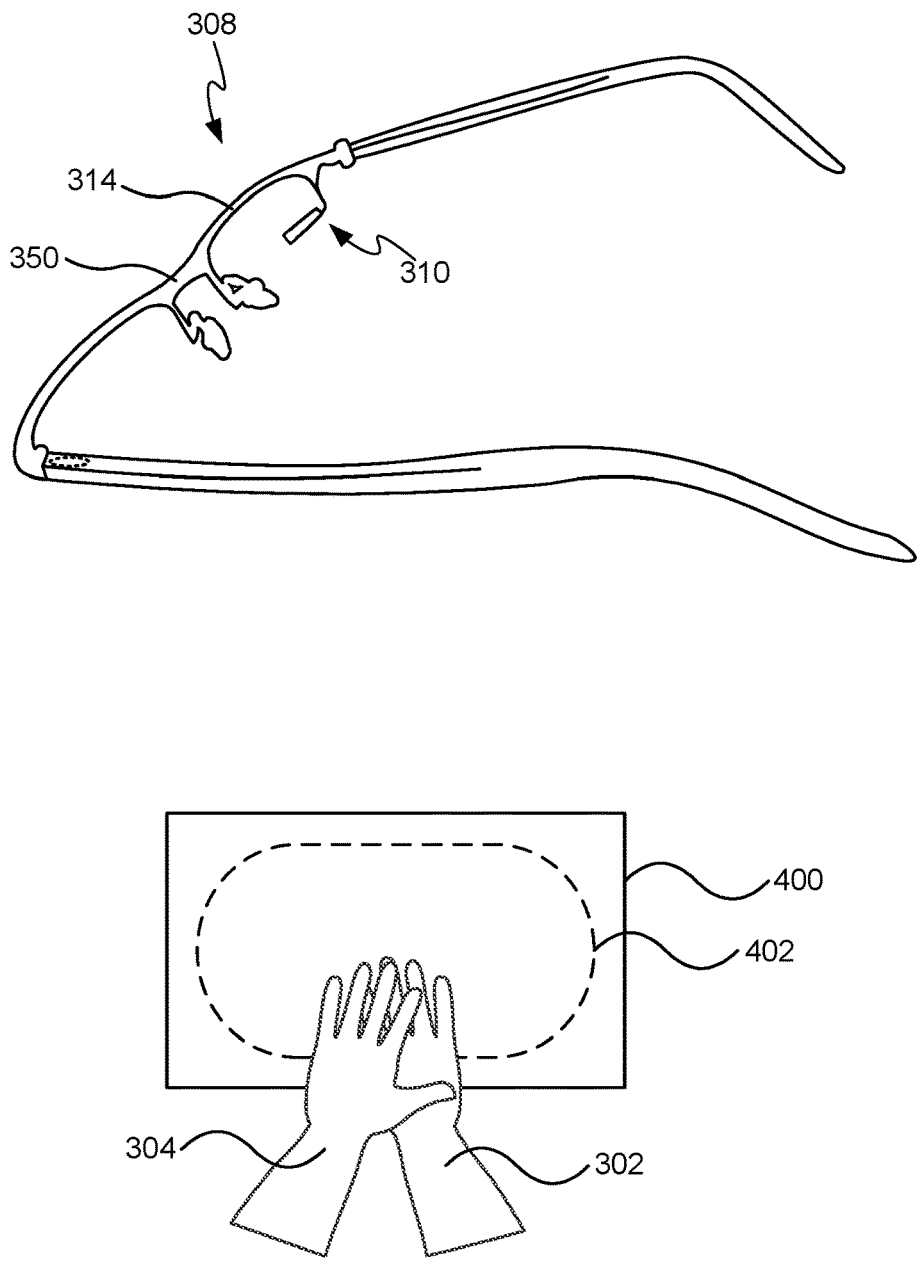
FIG. 4 is a perspective view of a head mounted computing device and a view seen by one eye of a wearer of head mounted computing device.

With reference to FIG. 3 and FIG. 4, the wearable computing device 308 may comprise a head-mounted display (HMD) device in the form of eyeglasses 308 that generate images creating a virtual reality or mixed reality experience. In this example the eyeglasses 308 include a micro-display 310 that is supported in front of a user's eye via a support arm 320 and display bridge 314. The micro-display 310 is able to project images directly into the user's eye in some examples. It will be appreciated that in other examples, the eyeglasses 308 may take other suitable forms in which a micro-display or other type of transparent, semi-transparent or non-transparent display is supported in front of a viewer's eye or eyes. It will also be appreciated that many other types and configurations of wearable display devices having various form factors may also be used within the scope of the present disclosure.

With reference to the eyeglasses 308 shown in FIGS. 3 and 4, in this example the micro-display 310 may be configured to project one or more images into the eye of a user. Where a micro-display 310 is available for each eye, images are projected into both eyes of the user. In this manner, the appearance of the user's physical environment may be augmented by graphical content (e.g., one or more images each having a respective color and brightness) that is presented via the micro-display 310.

The small form factor of the micro-display 310 enables the user 306 to view the physical environment with the eye facing the micro-display by easily looking over, under and around the micro-display. For example, in one example embodiment the micro-display 310 may have a length of approximately 10 mm and a square cross-section having sides of approximately 6 mm each. Other dimensions and cross-sectional profiles may also be utilized. It will also be appreciated that by utilizing one micro-display 310 for the user's right eye, the eyeglasses 308 also allow the user 306 to freely view the physical environment with the user's left eye.

The eyeglasses have a camera (not shown) facing away from the user's 306 head and located at a nose bridge portion 350 of the display bridge 314. The camera may capture two-dimensional image information and/or depth information from the physical environment and physical objects within the environment of the user 306. For example, the camera may include a depth camera, a visible light camera, an infrared light camera, a position tracking camera.

The eyeglasses 308 may include an integrated computing device in communication with the various sensors and systems of the eyeglasses and comprising the tracker 102. In other examples the eyeglasses 308 are communicatively connected to a separate computing device which comprises the tracker 102 and an augmented reality or virtual reality computing system.

FIG. 3 shows a tracking volume 300 of the eyeglasses 308 and shows the user's hands 302, 304 touching one another and reaching into the tracking volume 300. The tracker 102 monitors its tracking performance. For example, it detects that the user's hands are coming close together by monitoring the distance between the real world tracked positions of the two objects. It computes and outputs feedback to the augmented reality or virtual reality computing system. The feedback comprises instructions to modify the displayed positions of the avatar hands so they appear closer together than they are in the real world. This is implicit feedback to the user since the user is not aware of the feedback and is able to continue with his or her tasks. The feedback encourages the user to keep his or her hands apart so that tracking performance is enhanced.

For example, FIG. 4 shows a view from one eye of the user wearing the eyeglasses 308. The user sees a display region 400, an optional indication 402 of the tracking volume and avatar hands 304, 302 corresponding to his or her own hands. The avatar hands are touching each other whereas the user's real hands are not touching. In this way the tracker is able to achieve good tracking of the user's hands and the user is able to operate the virtual or augmented reality system in a natural manner.

In some examples the tracker provides the feedback by modifying the pose parameters 120 that it outputs to the downstream system 122. In this way the tracker is compatible with existing downstream systems 122 which provides cost benefits. The pose parameters are modified in order to bias them so that there is a deliberate mismatch between the tracked real world position and the pose parameters received by the downstream system 122.

Figure 5:
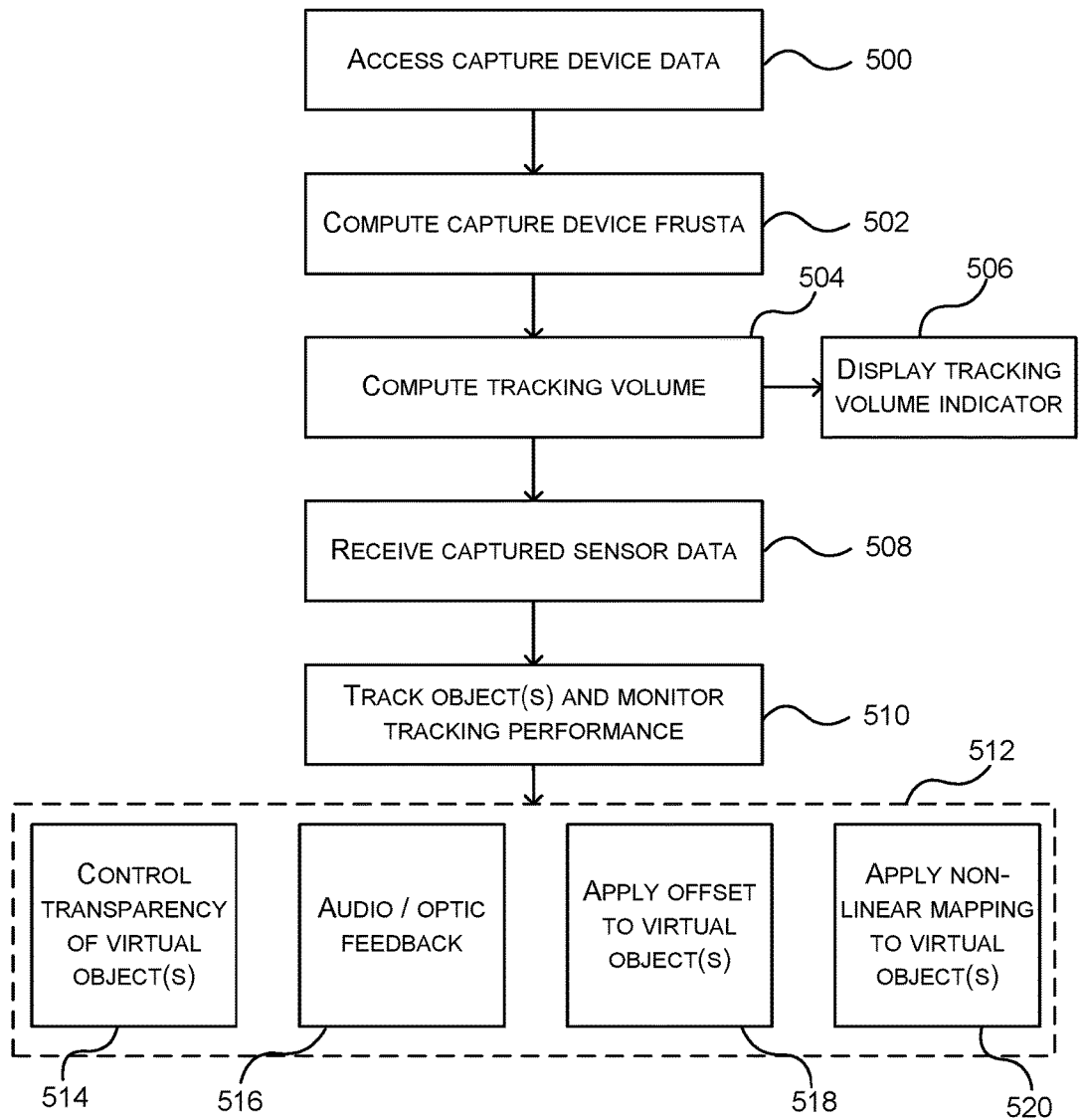
FIG. 5 is a flow diagram of a method at a tracker such as the tracker of FIG. 1.

FIG. 5 is a flow diagram of a method of operation at tracker 102. The tracker accesses 500 data about the capture device and computes 502 a capture device frustum (or frusta if there are two or more capture devices). It computes a tracking volume 504 using the frustum/frusta and optionally using empirical data. The tracker computes and outputs explicit feedback in some cases, as a tracking volume indicator 506. For example a visual, audio or haptic indicator of the tracking volume as described with reference to FIG. 2.

The tracker receives 508 captured sensor data from the capture device(es) and tracks 510 one or more objects depicted in the sensor data. It monitors its tracking performance. Tracking performance is monitored in some examples by comparing the tracked real-world position of the tracked object with the tracking volume, or by comparing the tracked real-world position of the tracked object with the tracked real-world position of at least one other object in the tracking volume. In some examples the tracking performance is monitored by checking factors such as how long it takes the tracker to compute an update, assessing uncertainty data computed by the tracker, assessing numbers of failed computations of the tracker and in other ways.

Where the monitored tracking performance indicates that tracking accuracy is dropping or is likely to drop, the feedback engine 104 computes and outputs feedback 512. The feedback may comprise adjusting values of pose parameters 120 output by the tracker such that an offset is applied to one or more virtual objects 518 depicting the tracked objects. For example, so that two hands appear closer together than they really are. In another example, the fingers appear more closed into a first than they are in reality. The feedback may comprise adjusting values of pose parameters 120 output by the tracker such that a non-linear mapping 520 is applied to virtual objects depicting the one or more tracked objects. The feedback may comprise audio or haptic feedback 516 encouraging a user to move the tracked object into the center of the tracking volume, or to move the tracked object into an environment with better lighting, or to remove occlusion or other factors which inhibit tracking. The feedback may comprise controlling transparency 514 of one or more virtual objects depicting the tracked objects. For example, so that tracked objects fade as they move away from the center of the tracking volume.

For example an indication is output when the tracked object comes within a threshold distance of a boundary of the tracking volume.

In some examples the pose parameters are adjusted so the display location does not correspond to the tracked real-world position. For example, using a non-linear mapping between the display location and the real-world position.

In some examples the pose parameters are adjusted such that the display location appears closer to a boundary of the tracking volume than the real-world position is to the boundary of the tracking volume.

In some examples the tracker is configured to track real-world position of a second object in the environment and the feedback is computed according to state/performance of the tracker in tracking both objects.

In some examples the feedback is computed according to distance between the real-world positions of the object and the second object.

Figure 6:
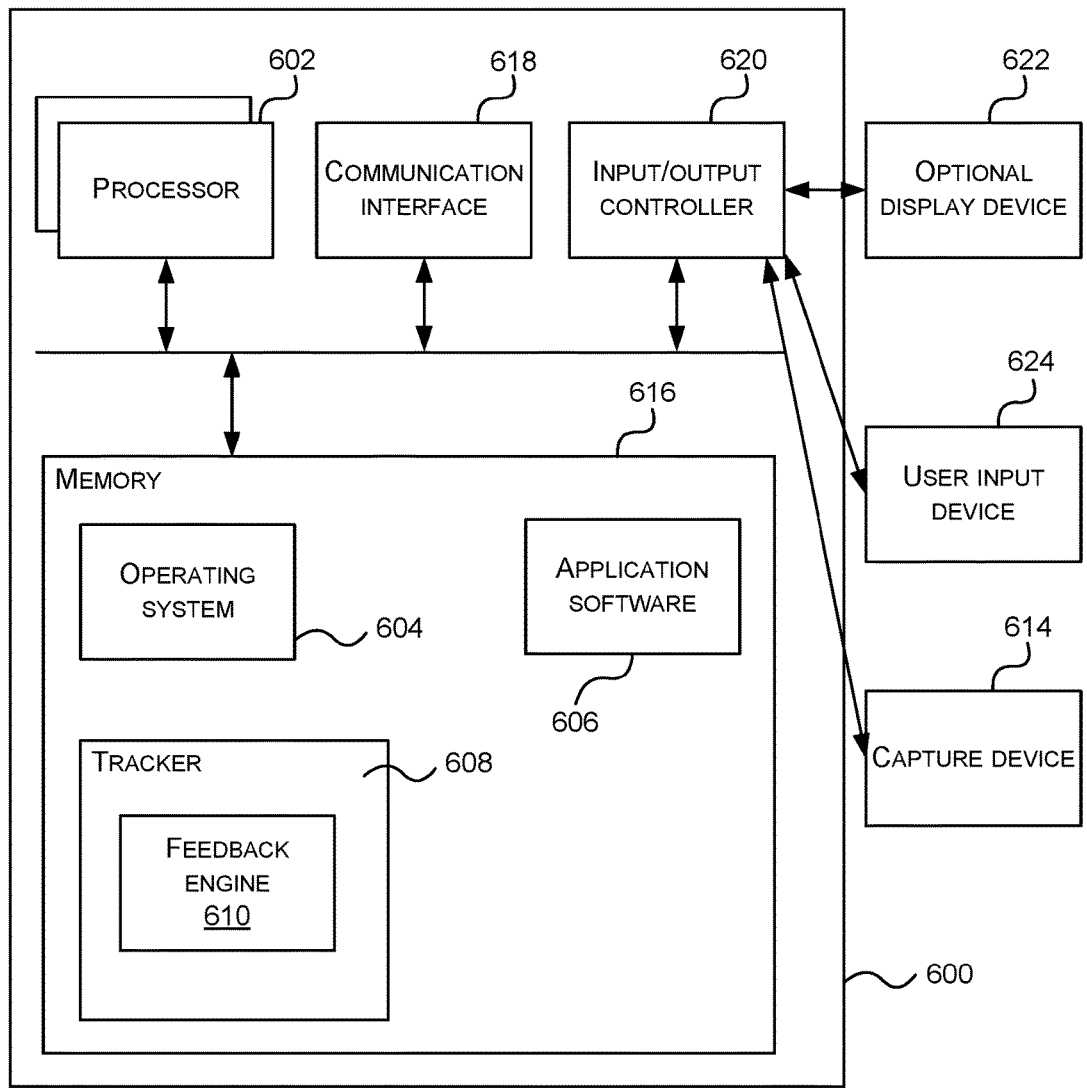
FIG. 6 illustrates an exemplary computing-based device in which embodiments of a tracker with a feedback engine may be implemented.

FIG. 6 illustrates various components of an exemplary computing-based device 600 which may be implemented as any form of a computing and/or electronic device, and in which embodiments of a tracker 608 with a feedback engine 610 may be implemented.

Computing-based device 600 comprises one or more processors 602 which may be microprocessors, controllers or any other suitable type of processors for processing computer executable instructions to control the operation of the device in order to track 3D pose parameters of one or more objects in an accurate manner. In some examples, for example where a system on a chip architecture is used, the processors 602 may include one or more fixed function blocks (also referred to as accelerators) which implement a part of the method of tracking and computing feedback in hardware (rather than software or firmware). Platform software comprising an operating system 604 or any other suitable platform software may be provided at the computing-based device to enable application software 606 to be executed on the device.

The computer executable instructions may be provided using any computer-readable media that is accessible by computing based device 600. Computer-readable media may include, for example, computer storage media such as memory 616 and communications media. Computer storage media, such as memory 616, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (memory 616) is shown within the computing-based device 600 it will be appreciated that the storage may be distributed or located remotely and accessed via a network or other communication link (e.g. using communication interface 618).

The computing-based device 600 also comprises an input/output controller 620 arranged to output display information to a display device 622 which may be separate from or integral to the computing-based device 600. The display information may provide a graphical user interface, a virtual reality display, an augmented reality display, or other display. The input/output controller 620 is also arranged to receive and process input from one or more devices, such as a user input device 624 (e.g. a mouse, keyboard, camera, microphone or other sensor). In some examples the user input device 624 may detect voice input, user gestures or other user actions and may provide a touch-less or multi-modal user interface. This user input may be used to operate a virtual or augmented reality system, game system, medical equipment, natural user interface or other system. In an embodiment the display device 622 may also act as the user input device 624 if it is a touch sensitive display device. The input/output controller 620 may also output data to devices other than the display device, e.g. a locally connected printing device.

Any of the input/output controller 620, display device 622 and the user input device 624 may comprise technology which enables a user to interact with the computing-based device in a natural manner, free from artificial constraints imposed by input devices such as mice, keyboards, remote controls and the like. Examples of technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of technology that may be used include intention and goal understanding systems, motion gesture detection systems using depth cameras (such as stereoscopic camera systems, infrared camera systems, rgb camera systems and combinations of these), motion gesture detection using accelerometers/gyroscopes, facial recognition, 3D displays, head, eye and gaze tracking, immersive augmented reality and virtual reality systems and technologies for sensing brain activity using electric field sensing electrodes (EEG and related methods).

In an example there is a computing device comprising:

an input configured to receive data captured by at least one capture device, the data depicting an object in an environment;

a tracker configured to track a real-world position and orientation of the object using the captured data;

a processor configured to compute and output feedback about performance of the tracker, where the feedback encourages a user to move the object for improved tracking of the object by the tracker.

For example the processor is configured to compute a tracking volume which is a region of real-world space in the environment for which the tracker is able to track objects anywhere in the volume.

For example the processor is configured to compute the tracking volume on the basis a view frustum of the at least one capture device and view frusta of any other capture devices providing input to the tracker.

For example the feedback comprises an indication of the tracking volume where the indication is output using any one or more of: a loudspeaker, a visual display, a haptic output device.

For example where the indication is output when the tracked object comes within a threshold distance of a boundary of the tracking volume.

For example the computing device is a virtual reality computing device or an augmented-reality computing device and where the processor is configured to display the tracked object as a virtual object at a display location.

For example, the processor is configured to compute pose parameters for the display location which do not correspond to the tracked real-world position.

For example, the processor is configured to compute pose parameters for the display location using a non-linear mapping of the real-world position.

For example, the processor is configured to compute pose parameters for the display location such that the display location appears closer to a boundary of the tracking volume than the real-world position is to the boundary of the tracking volume.

For example, the tracker is configured to track real-world position of a second object in the environment and wherein the feedback is computed according to performance of the tracker in tracking both objects.

For example, the feedback is computed according to distance between the real-world positions of the object and the second object.

For example, the tracker is configured to track real-world position of a second object in the environment and wherein the feedback is computed by applying an offset or a non-linear mapping to pose parameters of the object and the second object.

For example, the feedback is computed such that the virtual objects appear closer together than the real-world positions of the object and the second object.

For example, the tracker is configured to re-compute the real-world position using data captured by the at least one camera after the feedback has been output.

For example, the tracker is configured to track position and orientation of a plurality of joints of the object.

For example, the tracker is configured to compute values of shape parameters of the object.

In an example there is a computer-implemented method comprising:

receiving data captured by at least one capture device, the data depicting an object in an environment;

tracking a real-world position of the object using the captured data;

computing and outputting feedback about performance of the tracker, where the feedback encourages a user to move the object for improved tracking of the object by the tracker.

In examples the method comprises tracking real-world position of a second object in the environment and computing the feedback according to performance of the tracker in tracking both objects.

In examples the method comprises re-computing the real-world position using data captured by the at least one capture device after the feedback has been output.

In an example there is a computing device comprising:

an input configured to receive data captured by at least one capture device, the data depicting an articulated object in an environment;

a tracker configured to track a real-world position and orientation of a plurality of joints of the object using the captured data;

a processor configured to compute and output feedback about performance of the tracker, where the feedback encourages a user to move the articulated object for improved tracking of the object by the tracker.

In an example there is a computer-implemented apparatus comprising:

means (such as an input of tracker 102) for receiving data captured by at least one capture device, the data depicting an object in an environment;

means (such as tracker 102) for tracking a real-world position of the object using the captured data; and means (such as feedback engine 104) for computing and outputting feedback about performance of the tracker, where the feedback encourages a user to move the object for improved tracking of the object by the tracker.

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A computing device comprising:
   a processor; and
   a storage device comprising instructions, which when executed by the processor, configure the processor to:
   receive data captured by at least one capture device, the data depicting a first object in an environment;
   track, using a tracker, a real-world position and orientation of the first object in a tracking volume using the captured data and wherein the tracker is configured to track a real-world position of a second object in the environment; and
   compute and output feedback about performance of the tracker, where the feedback encourages a user to move the first object for improved tracking of the object by the tracker and wherein the feedback is computed by applying an offset or a non-linear mapping to pose parameters of the first object and the second object.

2. The computing device of claim 1 where the processor is configured to compute the tracking volume, wherein the tracking volume is a region of real-world space in the environment for which the tracker is able to track objects anywhere in the tracking volume.

3. The computing device of claim 2 where the processor is configured to compute the tracking volume on the basis a view frustum of the at least one capture device and view frusta of any other capture devices providing input to the tracker.

4. The computing device of claim 2 where the feedback comprises an indication of the tracking volume where the indication is output using any one or more of:
   a loudspeaker, a visual display, a haptic output device.

5. The computing device of claim 4 where the indication is output when the tracked first object comes within a threshold distance of a boundary of the tracking volume.

6. The computing device of claim 1 which is a virtual reality computing device or an augmented-reality computing device and where the processor is configured to display the tracked first object as a virtual object at a display location.

7. The computing device of claim 6 where the processor is configured to compute pose parameters for the display location which do not correspond to the tracked real-world position.

8. The computing device of claim 6 where the processor is configured to compute pose parameters for the display location using a non-linear mapping of the real-world position.

9. The computing device of claim 6 where the processor is configured to compute pose parameters for the display location such that the display location appears closer to a boundary of the tracking volume than the real-world position is to the boundary of the tracking volume.

10. The computing device of claim 1 wherein the feedback is computed according to performance of the tracker in tracking both the first and second objects.

11. The computing device of claim 10 where the feedback is computed according to distance between the real-world positions of the first object and the second object.

12. The computing device of claim 11 where the feedback is computed such that the virtual objects appear closer together than the real-world positions of the first object and the second object.

13. The computing device of claim 1 where the tracker is configured to re-compute the real-world position using data captured by the at least one camera after the feedback has been output.

14. The computing device of claim 1 where the tracker is configured to track position and orientation of a plurality of joints of the first object.

15. The computing device of claim 1 where the tracker is configured to compute values of shape parameters of the first object.

16. A computer-implemented method comprising:
   receiving data captured by at least one capture device, the data depicting a first object in an environment;
   tracking, using a tracker, a real-world position of the first object in a tracking volume using the captured data and wherein the tracker is configured to track a real-world position of a second object in the environment; and
   computing and outputting feedback about performance of the tracker, where the feedback encourages a user to move the object for improved tracking of the object by the tracker and wherein the feedback is computed by applying an offset or a non-linear mapping to pose parameters of the first object and the second object.

17. The method of claim 16 further comprising computing the feedback according to performance of the tracker in tracking both the first and second objects.

18. The method of claim 16 comprising re-computing the real-world position using data captured by the at least one capture device after the feedback has been output.

19. A computing device comprising:
   a processor; and
   a storage device comprising instructions, which when executed by the processor, configure the processor to:
   receive data captured by at least one capture device, the data depicting an articulated object in an environment;
   a tracker configured to track a real-world position and orientation of a plurality of joints of the articulated object in a tracking volume using the captured data and wherein the tracker is configured to track a real-world position of a second object in the environment; and
   a processor configured to compute and output feedback about performance of the tracker, where the feedback encourages a user to move the articulated object for improved tracking of the articulated object by the tracker and wherein the feedback is computed by applying an offset or a non-linear mapping to pose parameters of the first object and the second object.

* * * * *